S. J. FRANKLIN.
HARROW.
No. 192,249. Patented June 19, 1877.
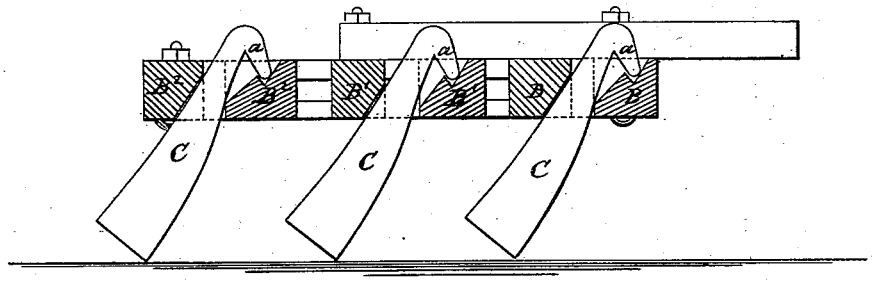
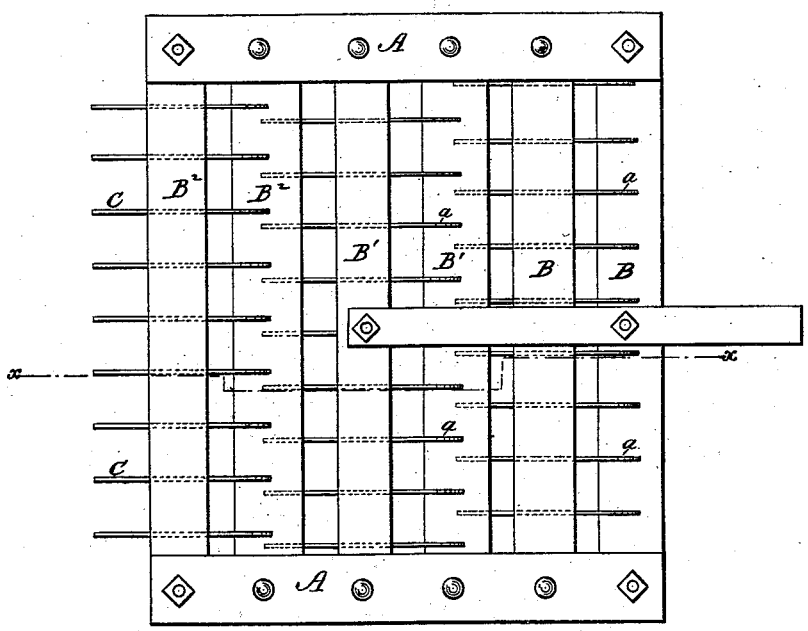
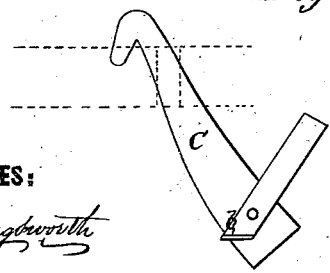
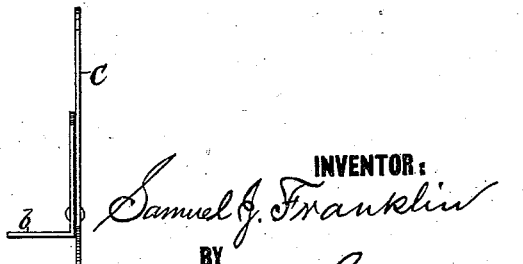
WITNESSES:
W. W. Hollingsworth
Edw. W. Byrn
INVENTOR:
Samuel J. Franklin
BY
ATTORNEYS.

UNITED STATES PATENT OFFICE.

SAMUEL J. FRANKLIN, OF FAIR MOUNT, GEORGIA.

IMPROVEMENT IN HARROWS.

Specification forming part of Letters Patent No. 192,249, dated June 19, 1877; application filed May 5, 1877.

*To all whom it may concern:*

Be it known that I, SAMUEL J. FRANKLIN, of Fair Mount, in the county of Gordon and State of Georgia, have invented a new and Improved Harrow; and I do hereby declare that the following is a full, clear, and exact description of the same, reference being had to the accompanying drawing, forming part of this specification, in which—

Figure 1 is a vertical section through line $x\ x$ of Fig. 2; Fig. 2, a plan view; Fig. 3, details, showing the attachment of scrapers to the harrow-teeth.

My invention consists in the peculiar construction and arrangement of teeth in a frame to form a harrow, the said teeth being made in the form of blades with a hooked upper end, which blades fit into slits in the frame, and when deflected to an angle of about forty-five degrees are securely held in said frame by means of their hooks without the use of pins, screws, bolts, keys, or other devices for securing them, as hereinafter more fully described.

In the drawing, A represents the side bars of the frame, which are securely bolted to and hold in place the sets of parallel bars B $B^1$ $B^2$. This frame is constructed preferably of light poplar scantling three by three and a half inches, and in whole dimensions is about three by five feet. C are the harrow-teeth, which are constructed, in the form of blades, from light wagon-tire iron, about three-eighths by one and a half inches in width and thickness, and about fourteen inches long. The front edges of said teeth are hammered sharp and hardened, and their upper ends are notched or cut in so as to form hooks $a$.

In fastening these teeth into the frame the set of bars B B, $B^1$ $B^1$, and $B^2$ $B^2$ are slitted or sawed transversely for the reception of the teeth, the front bar of each set of bars being sawed or slitted at its rear upper edge, while the rear bar of each set is similarly slitted in the same plane at its front under edge. Into these slits of the two bars B B, &c., and between the said bars of each set are fitted the teeth C. The teeth are then deflected to the rear, so as to incline at an angle of about forty-five degrees, in which position the ends of the hooks $a$ are embedded and securely held in the slits of the front bars, the draft strain, or resistance which the earth affords them when in motion serving to hold them more firmly in place.

In arranging the slits in the bars they are located at any suitable distance apart, but generally from four and a half to six inches, and the rows of teeth in the alternating sets of bars are arranged to cut between the tracks of the set of teeth immediately preceding, which arrangement, it will be seen, causes the soil to be opened and broken up into thin slices.

This form of harrow will thoroughly level and smooth the ground without choking with grass, &c., or catching into stumps and roots, the inclined blades serving to ride over or cut through such obstructions, which also makes the harrow light running.

I am aware of the fact that a harrow provided with inclined blade-shaped teeth is not new, and I do not claim such broadly; but it will be seen that by forming my teeth of the construction shown, and arranging them in the frame in the slits, I entirely dispense with the expense and trouble of nuts, bolts, keys, &c., for holding the teeth in place, and yet rigidly secure said teeth in the frame, so that they will neither turn nor pull out.

The arrangement also is such that the teeth may be readily taken out, if desired, without the use of a wrench, and the harrow is rendered of such simple construction as to enable any blacksmith or farmer with a few simple tools to construct the same.

In modifying my harrow I may make its frame in two sections, hinged together, and I may also apply to the harrow-teeth scrapers $b$, as shown in Fig. 3, which adapt the harrow to use as a cultivator, the said scrapers or sweep-wings being angular pieces of thin metal bolted to the lower portion of the harrow-teeth.

Having thus described my invention, what I claim as new is—

1. The harrow-tooth C, made in blade-form and provided with a hook, a, at its upper end, substantially as and for the purpose described.

2. The harrow consisting of the teeth C, made in blade-form, with a hook, a, at their upper ends, in combination with the sets of bars, slitted as described, to receive said teeth, substantially as and for the purpose set forth.

SAMUEL J. FRANKLIN.

Witnesses:
H. D. BRYANT,
C. R. TWITTY,
J. G. B. ERWIN.